Figure 1:
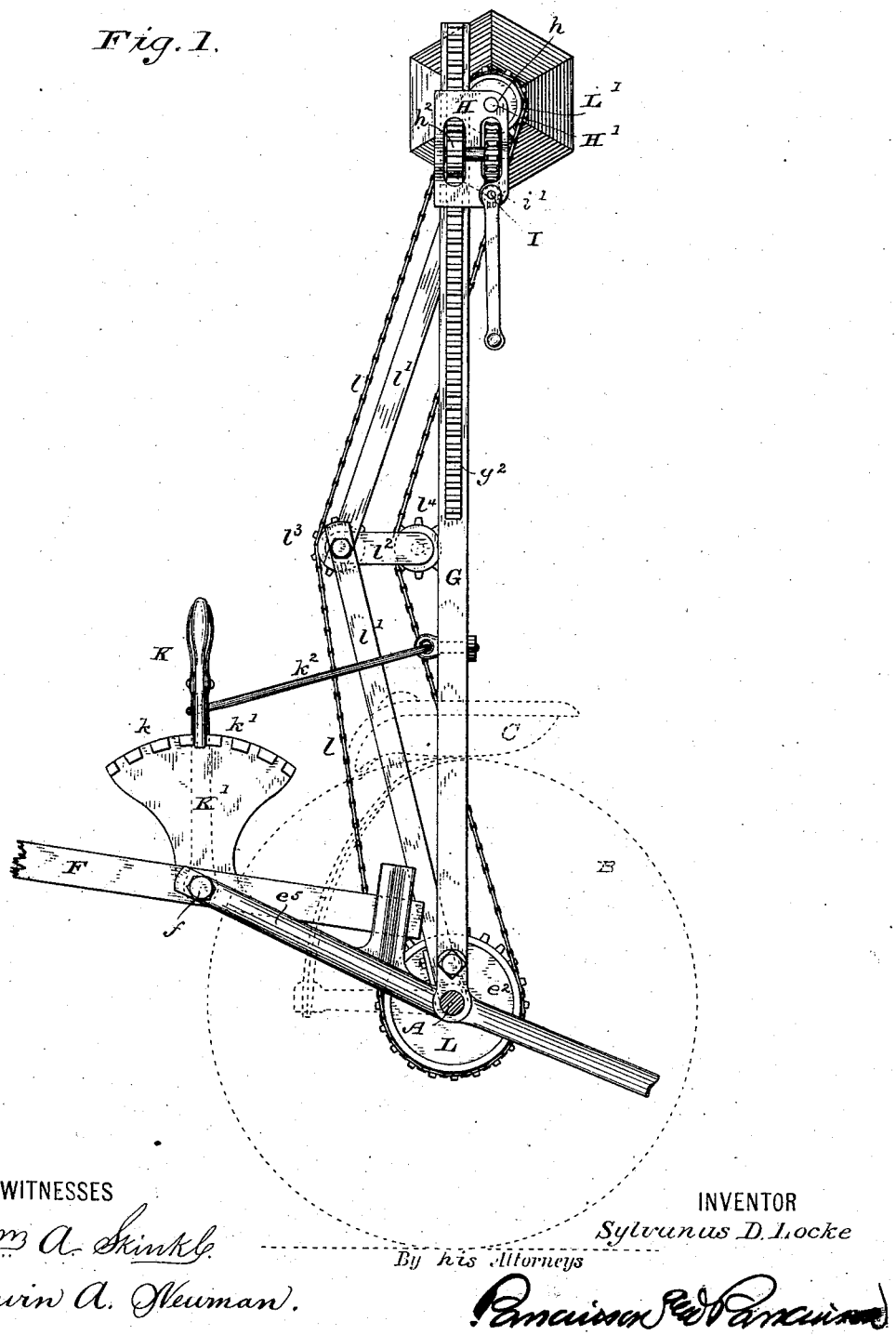

(No Model.) 3 Sheets—Sheet 1.

S. D. LOCKE.
HARVESTER REEL.

No. 292,238. Patented Jan. 22, 1884.

WITNESSES
Wm A. Skinkle
Edwin A. Newman

INVENTOR
Sylvanus D. Locke
By his Attorneys (No Model.)  3 Sheets—Sheet 3.

S. D. LOCKE.
HARVESTER REEL.

No. 292,238. Patented Jan. 22, 1884.

WITNESSES
Wm A. Skinkle
Edwin A. Newman

INVENTOR
Sylvanus D. Locke
By his Attorneys

UNITED STATES PATENT OFFICE.

SYLVANUS D. LOCKE, OF HOOSIC FALLS, NEW YORK.

HARVESTER-REEL.

SPECIFICATION forming part of Letters Patent No. 292,228, dated January 22, 1884.

Application filed April 3, 1883. (No model.)

*To all whom it may concern:*

Be it known that I, SYLVANUS D. LOCKE, of Hoosic Falls, in the county of Rensselaer and State of New York, have invented certain new and useful Improvements in Harvester-Reels, of which the following is a specification.

My invention relates in part to means for adjusting the reel-shaft upon its supporting-frame to change the height of the beaters or their distance from the cutter-bar, and in part to the mode of mounting the reel-frame upon the harvester; and it consists in the combination of a two-armed reel-supporting frame, an equal rackway upon each arm, carriers for the reel-bearings sliding on said arms, a reel-shaft supported in said carriers, an equal pinion journaled in each carrier and engaging with the rack on the corresponding arm, and a worm-wheel fixed mediately or immediately to each pinion, so that the two turn together as if integral, a shaft extending transversely across the frame and supported in bearings in the carriers, and worms keyed to said shaft opposite each worm-wheel and engaging therewith, whereby, when said shaft is rotated, the pinions will be caused to travel along the racks co-ordinately on each arm, to adjust the reel up or down; in the combination of a two-armed reel-frame, suitable supports to which said arms are pivoted, a lever and link connection to vibrate said frame upon its pivot and lock it in any adjustment, equal racks upon each of said arms, carriers sliding upon the arms and provided with equal pinions which engage with the racks, a reel-shaft journaled in said carriers, worm-wheels attached to each pinion, so as to turn therewith as if integral, a shaft extending transversely across the frame and journaled in each carrier, and worms fixed to said shaft opposite each worm-wheel and engaging therewith, whereby the reel may be adjusted along the supporting-arms co-ordinately by turning the worm-shaft; in the combination, in a single-wheel rear-cut harvester, of a main axle, a carrying-wheel mounted thereon, a wide main frame sleeved to the axle inside the carrying-wheel, a reel-support pivoted to the main frame by ears projecting therefrom immediately above the axle-sleeve, a reel-shaft adjustable along said support, means for vibrating the support upon its pivot and locking it in any desired adjustment, a radius-bar pivoted to the axle outside the supporting-frame, a second radius-bar pivoted to the reel-shaft and pin-jointed to the first at the meeting-point, a sprocket-wheel upon the end of the axle adjacent to its radius-bar, a second sprocket-wheel upon the reel-shaft in like relation to its radius-bar, an idle sprocket wheel or wheels at the joint of the two bars, and a chain-belt connecting the sprocket-wheel on the main axle, and the sprocket-wheel on the reel-shaft, and guided and held taut by the intermediate sprocket-wheels and the action of the radius-bars; in the combination of a main shaft, a seat supported from the axle outside of the carrying-wheel, a wide main frame sleeved to the extended axle inside of the carrying-wheel, a two-armed reel-support pivoted to said main frame by ears projecting immediately above the axle-sleeves, a draft-tongue jointed to the main frame in advance of its connection with the axle, a lever pivoted to the draft-tongue in line with or close proximity to the pivot of the latter, a link connecting said lever with the reel-support, and a segment-rack into which a dog from said lever locks, whereby the driver may control the vibrations and position of the reel-support; in the combination of a main axle, a carrying-wheel mounted thereon, a seat supported from the axle outside the carrying-wheel, a main frame having an extended bearing upon the axle inside of the carrying-wheel, the axle for that purpose being prolonged, a two-armed reel-supporting frame pivoted to said main frame by means of ears rising therefrom immediately above the axle-sleeve, a draft-tongue pivoted to the main frame in advance of the axle, a lever pivoted to said draft-tongue in line with or close proximity to the pivot of the latter, a link connecting said lever and reel-frame, and a segment into which the lever latches, equal racks upon each arm of the reel-frame, a journal-carrier—one to each arm—having equal pinions, which mesh into said racks, a worm-wheel fast with each pinion, a reel-shaft supported in the bearings of the carriers, and a crank-shaft extending across the supporting-frame and provided with worms—one to each worm-wheel— whereby the driver in his seat can control the in and out adjustment of the reel by means of the lever and the up and down adjustment by means of the crank; and in the various other combinations and details of construction hereinafter pointed out and claimed.

Figure 2:
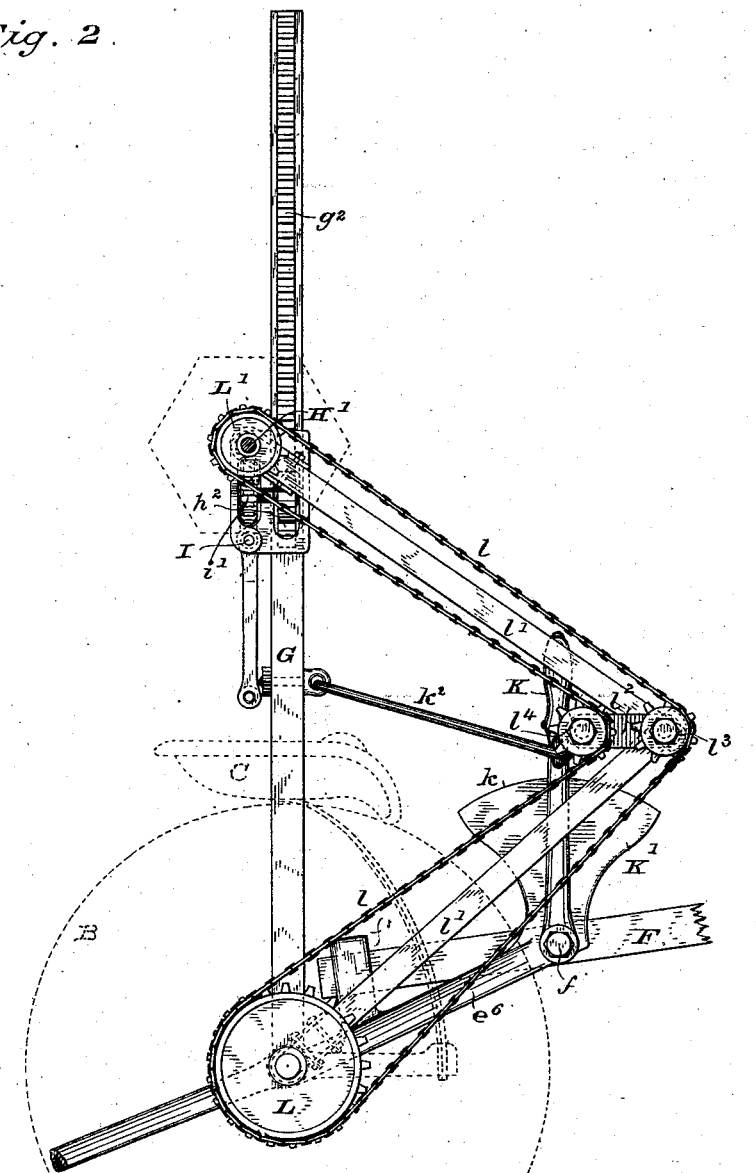
Figure 3:
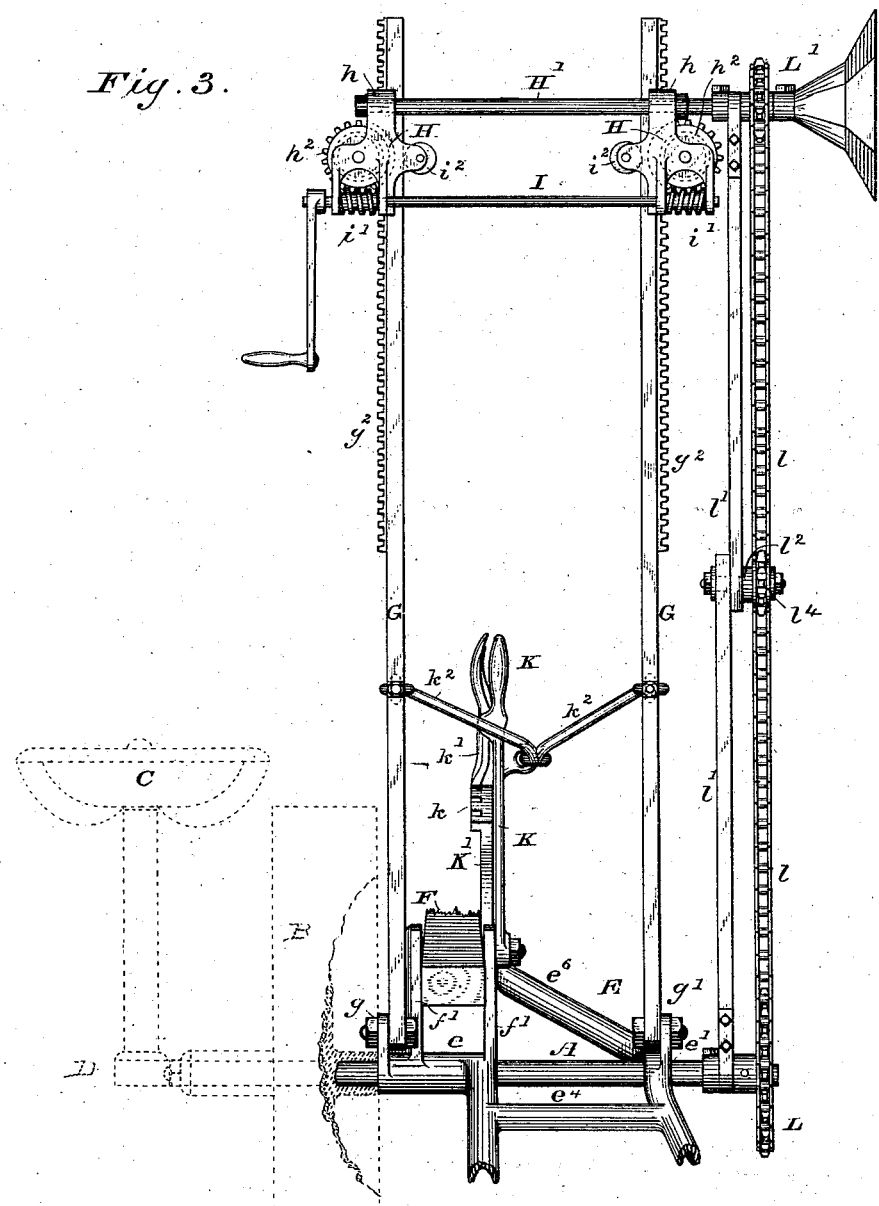

In the drawings, Figure 1 is an elevation from the stubble side of a reel-supporting frame and adjusting mechanism, and so much of a single-wheel harvester and its main frame as is necessary to an understanding of my invention. Fig. 2 is an opposite elevation from the grain or divider side of the machine, and Fig. 3 a rear elevation.

A represents the main axle, and B the main or carrying wheel; C, the seat borne upon a standard from a support, D, sleeved upon the axle outside the wheel, and braced by a rod extending to the tongue or to a foot-rest offsetting therefrom. Inside of the wheel the axle is prolonged much beyond the length usual in single-wheel reapers, and receives the supporting-frame E, which has a broad sleeve, $e$, next the wheel, and abutting against the inner hub, to prevent lateral displacement in that direction, and at some distance outside of this a second sleeve-bearing, $e'$, upon the axle. From the first sleeve an arm, $e^2$, extends rearwardly parallel, or nearly parallel, with the wheel and not far removed therefrom, and from the second sleeve an arm, $e^3$, extends diagonally to the rear, flaring away from the first arm. At a short remove from the axle these two arms are connected and stiffened by a cross-bar, $e^4$, and at their rear ends they are intended to have bearings for a strong rock-shaft, which supports the grain-wheel in a crank-arm at the outer end, has a lever-connection with the frame at the inner end, whereby it can be oscillated, and itself forms an axle or journal for the platform, which is thus hinged to the main frame. In front of the axle the frame has a forwardly-extending arm, $e^5$, from the first or inner sleeve, the broad one next the wheel, and a second arm, $e^6$, directed obliquely from the second or outer sleeve toward the other; and at the front end of these arms the draft-tongue F is pivoted to them by a bolt, $f$, with a heel end projecting rearwardly to, or nearly to, the axle. From the inner sleeve, and from the forwardly-projecting arm connected therewith, guides or keepers $f'$ rise vertically, embracing between them the heel end of the draft-tongue, and steadying it against lateral movement while permitting a vertical vibration; and from said heel end it is expected that connection will be made with the same adjusting or controlling mechanism on the main frame that governs the lever from the rock-shaft, thereby enabling the driver to make the proper relative adjustment of platform and of draft-tongue by a single instrumentality and at the same time.

The machine as thus far described, with the various details of construction, which it has not been thought necessary to mention here, is made the subject of another application filed by me concurrently herewith, and none of its parts are claimed herein, either separately or in combination, except so far as they may form elements of combinations into which the reel and its support enter. As the latter is primarily intended for this machine or for others containing equivalent accessory features, it will be described in connection therewith, premising, however, that it, with its supporting-frame and adjusting mechanism, may be removed bodily and applied to machines of another type; and in its purely local combinations is not to be taken as limited by the description to use in connection with any particular species of harvester.

From the inner sleeve of the main frame, close to the axle, rises a lug or ear, $g$, and from the outer sleeve a lug, $g'$. To these, respectively, are pivoted the arms G of the reel-supporting frame. If convenient, however, they may, and with benefit can be, pivoted directly to the axle, as the purpose in pivoting them to the sleeves is to bring them as near as possible thereto. At the outer ends of these arms are equal racks $g^2$, either placed on the external faces of the arms, as shown, back to back, or else placed on the internal faces, front to front, or even, if desired, placed upon the upper or under surface, or with the back of one to the teeth of the other. The first and second positions named are perhaps the best, as they are more perfectly secure against springing, while the last position permits certain other mechanism to be made in duplicate. Upon each arm is a carrier, H, having bearings $h$ for the reel-shaft H', extending transversely across the frame, and supported in each bearing. A pinion, $h'$, is pivoted in each carrier, with its teeth meshing in the rack on the corresponding arm, and the two pinions are equal in size and number of teeth. Pinned or keyed upon the spindles or gudgeons of these pinions, or preferably cast integral therewith, are worm-wheels $h^2$, above the plane of the reel-frame, but still within the carrier. A crank-shaft, I, extends across the frame, and is pivoted in ears $i'$ from the carrier—preferably two ears to each carrier. Opposite a section of the worm-wheel, between these ears, the shaft receives worms $i'$, which mesh with the teeth of the worm-wheel, so that when the crank is turned these wheels will be driven co-ordinately, driving the pinions, which will travel up and down the racks the same distance for the same number of revolutions, taking with them the carriers and displacing the reel-shaft laterally, to adjust it along the supporting-arms. The carriers, it will be understood, embrace the supporting-arms in such manner that they cannot be removed therefrom except by being taken over their ends. To lighten or ease their journey they (the carriers) are provided with small rollers or trucks $i^2$, so pivoted in ears at the back or inner side of each that they are in direct opposition to the pinions, and travel upon the inner edge of the arms as the latter travel on the outer, serving thus not only to relieve friction, but to hold the arms and their racks up against the pinions and make the engagement certain. The carriers, crank-shaft, and worm-gearing, and the mechanism which they operate control the up-and-down adjustment of the reel, or its adjustment in and out relatively to the pivot of the supporting-frame, according to the position originally given said frame, whether vertical or horizontal.

In all modern reels a second motion is deemed necessary or desirable in order to secure a resultant or compound adjustment. To obtain this a lever, K, is pivoted to the draft-tongue in line with the axis upon which the latter vibrates, and advisably as herein, by the same bolt $f$, or else in close proximity to this axis, for the reason that at this point there is no displacement relative to the pivot of the reel-support. The lever may, of course, be pivoted on the main frame itself with the same result; but to make it convenient to the driver in his seat outside the wheel it is an object to get it as far forward as possible without incurring liability to relative play between it and the frame in the flexions between the tongue and the latter.

From the end of the oblique frame-bar opposite the lever-pivot rises a segment, K', having a rack, $k$, into which a dog from the lever-handle takes, to hold the lever in any given adjustment; and from an eye on the lever, or from any arm rigid therewith, a forked link, $k^2$, extends to the reel-support—one arm of the link to each arm of the support—so as to brace it firmly and hold it rigidly so long as the lever is locked to the segment, but to throw it back or forth as the lever is moved along said segment. The driver can now, from his seat, throw the reel-support backward to carry the reel over the platform or bring it in advance of the cutters, and lock it in position by latching the lever into the segment, and by turning the crank can raise and lower said reel to carry it farther from or bring it nearer to the ground. When the crank is released, the reel will remain in its position along the support, as the worm-gearing will not give unless intentionally operated, it thus taking the place of a locking device, as well as itself constituting the instrumentality by which movement is imparted in the adjustment.

It is intended to communicate motion directly from the axle to the reel. Therefore a sprocket-wheel, L, is pinned to the outer end of the axle, beyond the main frame, and another sprocket-wheel, L', pinned to the reel-shaft above the first, and a chain, $l$, is thrown over the two. As the reel-shaft in its up-and-down adjustment is carried away from or taken nearer to the main axle, the chain will be tightened or slackened, and so either block the adjustment or become inoperative, without some device to yield to take up this slack and preserve a substantially constant tenseness of the chain within all practical or reasonable limits of adjustment. This is furnished by radius-bars $l'$, one of which is pivoted to the main axle, between the sprocket-wheel and the main frame, and the other to the reel-shaft, between the sprocket-wheel thereon and the adjacent supporting-arm. At their meeting ends the two radius-bars are pin-jointed to each other and carry an idle sprocket-pinion, $l^2$. From the joint also a link, $l^3$, extends a short distance, and carries at this end a second idle sprocket-pinion, $l^4$, over which pinions the chain is carried, they serving as guides. These radius-bars, by their flexions upon the pin-joint, as the reel-shaft is brought toward the main axle, or as it is carried away therefrom, will take up or let out slack as fast as demanded, thus keeping the chain at all times taut.

I claim—

1. The combination, substantially as hereinbefore set forth, of the two-armed reel-support, the equal racks on said arms, the carriers on each arm, the reel-shaft journaled in said carriers, the equal pinions in each carrier engaging with the racks, the worm-wheels fixed to said pinions, so as to move therewith as integral, the crank-shaft extending transversely across the supporting-frame and journaled in ears from the carriers, and the worms upon said crank-shaft engaging with the worm-wheels, whereby the reel-shaft will be adjusted co-ordinately at each end along the frame by revolving the crank-shaft.

2. The combination, substantially as hereinbefore set forth, of the two-armed reel-supporting frame, the equal racks upon said arms, the carriers traveling upon said arms, the reel-shaft extending transversely across the frame and journaled in said carriers, the equal pinions pivoted in said carriers and engaging with the racks, the rollers or trucks opposing said pinions and holding the racks in engagement therewith, the worm-wheels fixed to said pinions, the crank-shaft journaled in ears from each carrier, and the worms upon said crank-shaft engaging with the worm-wheels.

3. The combination, substantially as hereinbefore set forth, of the two-armed reel-supporting frame, the equal racks upon said arms, the carriers traveling upon said arms, the reel-shaft extending transversely across the frame and journaled in said carriers, the equal pinions pivoted in the carriers and engaging with the racks, the worm-wheels fast to said pinions, the crank-shaft journaled in ears from the carriers, and the worms fixed to said shaft between the ears of each carrier.

4. The combination, substantially as hereinbefore set forth, of the two-armed reel-supporting frame, the equal racks upon the outer sides or edges of said arms, back to back, the carriers traveling upon said arms, the reel-shaft extending transversely across the frame and journaled in said carriers, the equal pinions pivoted in said carriers and engaging with the racks, the worm-wheels fixed to said pinions, the worm-shaft extending across the reel-frame and supported in ears from each carrier, the worms fixed to said shaft and each engaging with a section of the corresponding worm-wheel exposed by said ears, and the rollers or trucks pivoted in the carriers to bear against the inner sides or edges of the frame-bars in opposition to the pinions and hold the racks up against said pinions.

5. The combination, substantially as hereinbefore set forth, of the main axle, the single carrying-wheel mounted thereon, the main frame sleeved to said axle prolonged inside of the carrying-wheel, the two-armed reel-support pivoted to said main frame immediately above its bearing upon the axle, the reel-shaft and mechanism for adjusting it in and out along said arms, the sprocket-wheel fixed to the end of the axle outside of the frame, the chain connecting said sprocket-wheel with an opposing sprocket-wheel on the reel-shaft, and the radius-bars pivoted, respectively, to the axle and to the reel-shaft, and pin-jointed to each other at their meeting ends, provided with idle sprocket-pinions or guides for said chain at or in proximity to the pin-joint.

6. The combination, substantially as hereinbefore set forth, of the main axle, the single carrying-wheel mounted thereon, the seat supported from the axle outside of the carrying-wheel, the wide main frame sleeved to the axle prolonged inside of the carrying-wheel, the two-armed reel-support pivoted to said main frame immediately above its bearing upon the axle, the racks upon said arms, the carriers traveling along the arms, and their pinions taken into the racks, the worm-wheels fast to said pinions, the crank-shaft and its worms engaging with said worm-wheels, and the reel-shaft journaled in said carriers, whereby the driver in his seat may adjust the reel up and down by turning the crank-shaft.

7. The combination, substantially as hereinbefore set forth, of the main axle, the single carrying-wheel mounted thereon, the driver's seat supported from the axle outside of the carrying-wheel, the wide main frame sleeved to the extended axle within the carrying-wheel, the two-armed reel-supporting-frame pivoted to said main frame immediately above its bearing upon the axle, the racks upon said arms, the carriers and their equal pinions engaging with said racks, the worm-wheel fast to said pinions, the crank-shaft and its worms engaging with said worm-wheels, the reel-shaft journaled in the carriers to be adjusted as they travel along the racks, the sprocket-wheel on the outer end of the axle, and the opposing sprocket-wheel on the reel-shaft, the radius-bars pivoted, respectively, to the main axle and to the reel-shaft, and pin-jointed at their meeting ends, and the idle sprocket-pinions or guide-wheels carried by them at said joint or in close proximity thereto, whereby the slack of the chain will be taken up or let out as the reel-shaft is adjusted.

8. The combination, substantially as hereinbefore set forth, of the main axle, the single carrying-wheel mounted thereon, the driver's seat supported from the axle outside of the carrying-wheel, the main frame having two sleeve-connections with said axle prolonged, the two-armed reel-supporting frame pivoted to said main frame immediately above the sleeve-bearing thereof upon the axle, the draft-tongue pivoted in forwardly-extending arms from said frame, the lever pivoted to the draft-tongue at or near its pivotal attachment to the frame, the segment into which such lever latches, and the link-connection with the reel-frame.

9. The combination, substantially as hereinbefore set forth, of the main axle, the carrying-wheel mounted thereon, the driver's seat supported upon the axle outside of the carrying-wheel, the wide main frame having two sleeve-bearings upon the axle prolonged inside of the carrying-wheel, the draft-tongue pivoted in forwardly-extending arms or bars on said frame, the lever pivoted to said draft-tongue, the two-armed reel-supporting frame pivoted to the main frame immediately above the sleeve-bearings of the latter upon the axle, and the forked link connecting the lever on the draft-tongue with each arm of the reel-frame.

10. The combination, substantially as hereinbefore set forth, of the main axle, the carrying-wheel mounted thereon, the driver's seat supported from the axle outside of the carrying-wheel, the wide main frame sleeved upon said axle, the two-armed reel-supporting frame pivoted to said main frame immediately above its bearing upon the axle, the draft-tongue pivoted between forwardly-extending arms from said main frame, the lever pivoted to the draft-tongue by the same pivot-bolt securing the latter, the segment and its rack rising from the front end of one of the frame-bars above said pivot, a dog upon the lever taking into said rack, and a link-connection between the lever and the reel-frame.

11. The combination, substantially as hereinbefore set forth, of the main axle, the carrying-wheel mounted thereon, the driver's seat supported from the axle outside of the carrying-wheel, the wide main frame sleeved to said axle, the two-armed reel-supporting frame pivoted to said main frame immediately above its bearing upon the axle, the equal racks upon said arms, the carriers and their equal pinions engaging with said racks, the worm-wheels, crank-shaft, and worms driving said pinions, the reel-shaft journaled in said carriers, the draft-tongue pivoted between forwardly-extending arms from the main frame, the lever pivoted to the draft-tongue at its joint with the main frame, and the link-connection between said lever and the reel-frame.

SYLVANUS D. LOCKE.

Witnesses:
 WM. H. BATES.
 WM. A. SKINKLE.